April 22, 1924.
W. DZUS
MOTOR FAN WHEEL
Filed Jan. 31, 1923   2 Sheets-Sheet 1
1,491,589
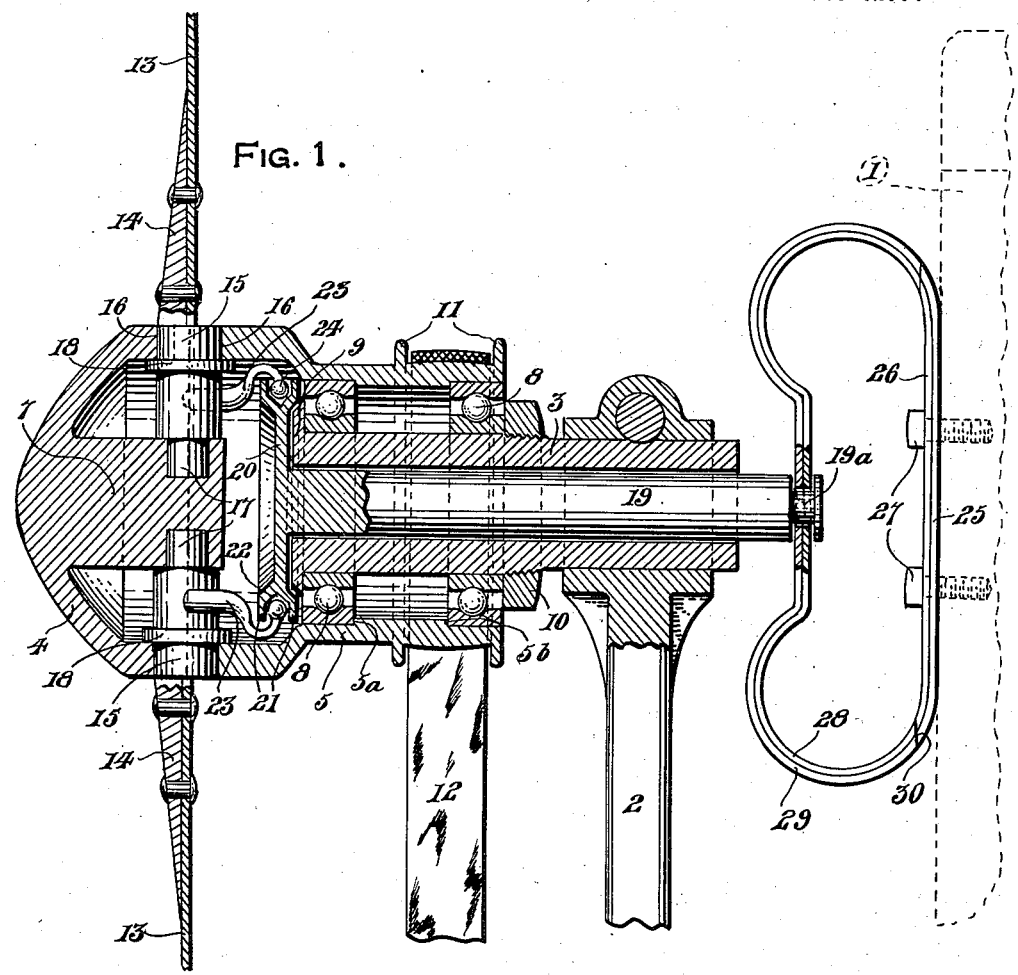
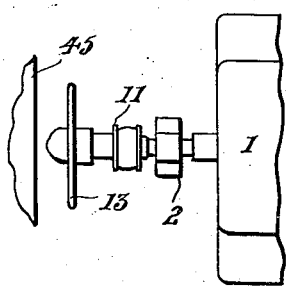
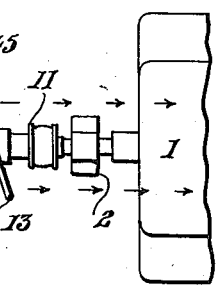
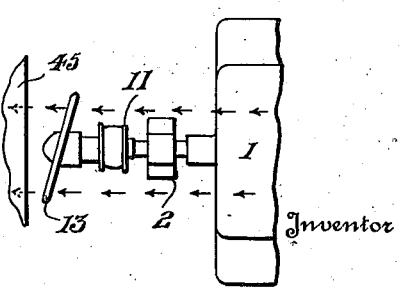
Inventor
William Dzus
By
F. L. Bryant,
Attorney.

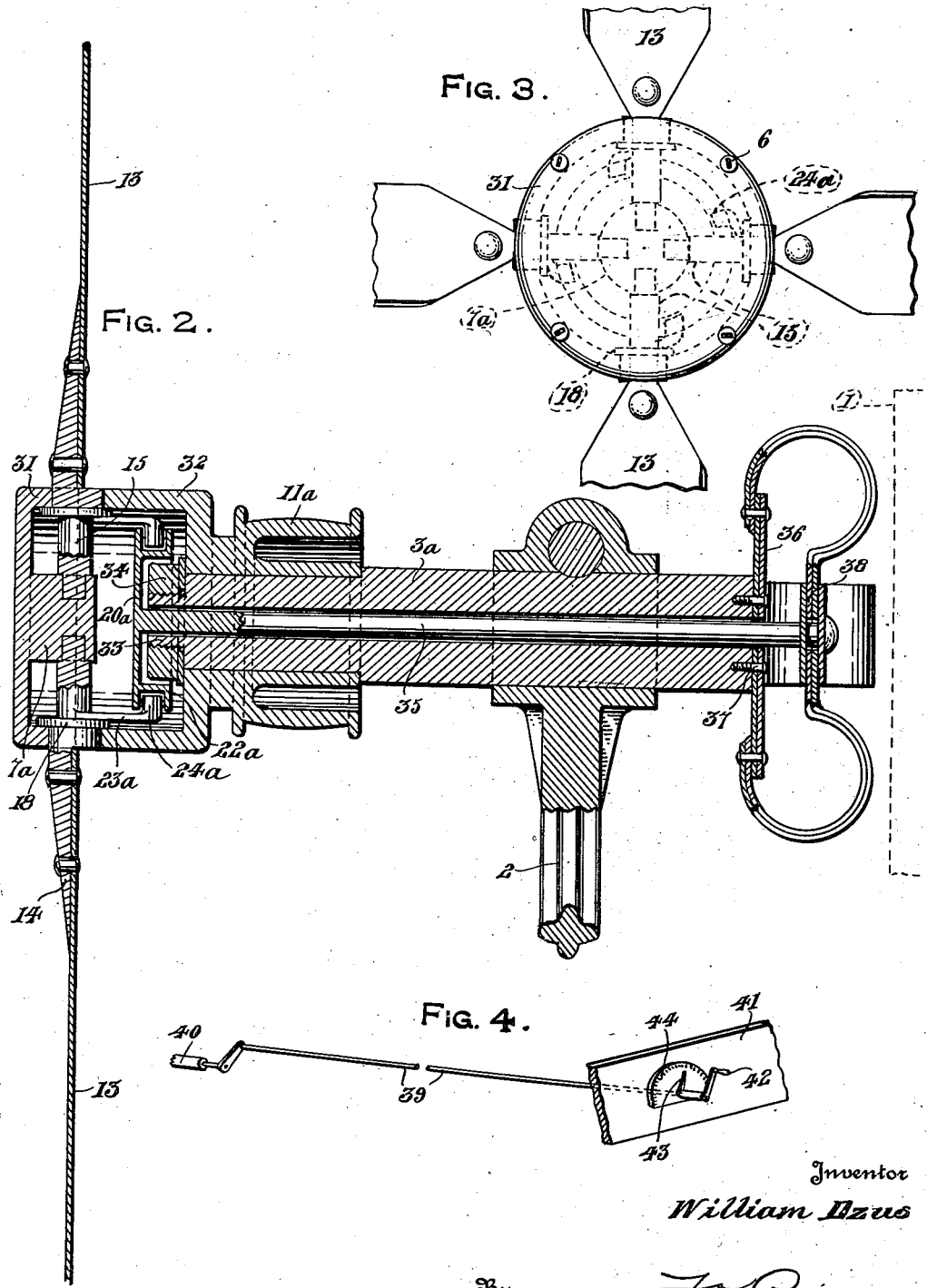

Patented Apr. 22, 1924.

1,491,589

UNITED STATES PATENT OFFICE.

WILLIAM DZUS, OF SARANAC LAKE, NEW YORK, ASSIGNOR OF TWENTY-FIVE PER CENT TO L. M. BECKER, OF SARANAC LAKE, NEW YORK.

MOTOR FAN WHEEL.

Application filed January 31, 1923. Serial No. 616,215.

*To all whom it may concern:*

Be it known that I, WILLIAM DZUS, a citizen of Ukrainia, residing at Saranac Lake, in the county of Franklin and State of New York, have invented certain new and useful Improvements in Motor Fan Wheels, of which the following is a specification.

This invention relates to certain new and useful improvements in motor fan wheels, and has particular reference to that type of fan wheel associated with the motor or engine of an automobile or other motor vehicle.

The primary object of the invention is to provide a fan wheel for automobile engines wherein the blades of the fan wheel are of the feathering type with means associated therewith for varying the positions of the fan blades according to the temperature conditions of the automobile engine and radiator associated therewith.

A further object of the invention is to provide a fan wheel associated with an automobile engine and having feathering blades with a thermostatic element associated with the blades for varying the positions thereof for either forcing a current of air in a direction toward the engine or draw the air therefrom.

With the above general objects in view and others that will appear as the nature of the invention is better understood, the same consists of the novel form, combination and arrangement of parts hereinafter more fully described, shown in the accompanying drawings and claimed.

In the drawings, wherein like reference characters designate corresponding parts throughout the several views, Figure 1 is a detail sectional view showing the fan mounting for an automobile engine, the blades of the fan being of the feathering type with a thermostatic element associated with the feathering blade for varying the angular positions thereof, the thermostatic element having direct contact with the body or block of automobile engines, Figure 2 is a sectional view similar to Fig. 1 showing a different mounting for the fan pulley and connecting means between the feathering blades and thermostatic element, the latter being spaced from the automobile engine, Figure 3 is a fragmentary front elevational view of the fan wheel, Figure 4 is a fragmentary perspective view of another form of the invention showing manually operable means positioned on the instrument board of an automobile for varying the angularity of the feather blade, Figure 5 is a fragmentary diagrammatic top plan view showing the neutral position of the fan blades when the atmosphere, radiator and engine are of similar temperature, Figure 6 is a view similar to Fig. 5 showing the position assumed by the feathering blades when the engine is heated, and Figure 7 is a similar view showing the position of the feathering blade when the temperature of the radiator is lower than that of the engine for drawing heated air from engine toward radiator.

Briefly described, the present invention aims to provide a motor fan wheel wherein the blades of the wheel are of the feathering type and are adapted to be shifted to different angular positions with respect to the temperature of the engine and radiator. The feathering movements of the blades may be accomplished in various ways, one form of the invention including a thermostatic element directly connected to the engine body or block and operatively connected to the feathering blade, while another form of the invention includes the provision of a thermostatic element positioned in proximity of the engine body or block, but unattached thereto. A still further form of the invention embodies manually operable means mounted on the instrument board of the automobile for varying the angular positions of the feathering blades, a dial plate being associated with the operative means for indicating the positions of the feathering blades. When the engine is of a temperature similar to the temperature of the radiator and external atmosphere, the feathering blades will assume a neutral position to the extend of not producing air currents in directions toward the engine or radiator. When the engine becomes heated, the feathering blades will assume an angular position for drawing air through the radiator and directing the same toward the engine, while the position of the feathering blades will be reversed when the engine and radiator are in a cold condition directing heated air from the engine exhaust manifold toward the radiator.

Referring more in detail to the accompanying drawings, and particularly to Fig. 1, there is illustrated a motor fan wheel and mounting for association with an automobile engine 1, the mounting for the fan including a bracket arm 2 supported in the usual manner at a point spaced forwardly of the engine 1 and supporting at its upper end a horizontally disposed forwardly extending sleeve 3, the sleeve being retained in the upper end of the bracket against rotation.

The fan includes a head formed of sections 4 and 5, the section 5 being of tubular formation with the adjacent edges of the sections 4 and 5 secured together as at 6, shown in Fig. 3. The section 4 of the fan head is of hollow formation and carries a central plug 7 extending across the mating line of the sections 4 and 5.

The connection between the fan head and the sleeve 3 includes a pair of spaced ball bearing races 8 surrounding the forwardly projecting end of the sleeve with the tubular section 5 of the fan head enclosing the ball races as illustrated, the forward end of the sleeve 3 carrying an outwardly directed annular shoulder 9 against which the adjacent ball bearing race engages while a shoulder 5ª formed on the head section 5 engages the opposite edge of said race. A jamb nut 10 threaded on the sleeve 3 engages the other ball race 8 and moves the same into engagement with the shoulder 5ᵇ on the head section 5, thereby rotatably retaining the fan heads upon the bracket 2 and sleeve 3. Pulley flanges 11 are formed at the inner end of the head section 5 and provide a pulley section over which a belt 12 traverses.

The blades 13 of the fan are each secured at their inner ends to a bracket 14 carried by a radial bearing stud 15 that is journaled in registering recesses 16 formed in the adjacent edges of the fan head sections 4 and 5, the inner ends of the bearing studs 15 being reduced as at 17 and radially journaled in the plug 7, outward movement of the bearing studs 15 being prevented by the annular flanges 18 carried thereby and engaging the inner faces of the sections 4 and 5.

To effect feathering movements of the blades 13, a shaft 19 is axially shiftable in the sleeve 3, the forward end of the shaft extending into the fan head carrying a disc 20, the peripheral edge of which is split to provide spaced annular flanges 21 defining an intermediate annular groove 22. Each bearing stud 15 of the fan blade carries a laterally positioned arm 23 formed rigid therewith, the arms 23 projecting on a line at right angles to the longitudinal axes of the bearing stud, and each carrying a ball 24 upon the inner free end that is freely received in the annular groove or channel 22.

As shown in Fig. 1, a thermostatic element is associated with the inner end of the axially movable shaft 19 for shifting the same in the sleeve 3 to feather the fan blades 13, the thermostatic element, as illustrated, a strip 25 of brass, and a strip 26 of steel, the strips being superposed as illustrated and bolted as at 27 to the body of the engine 1, the brass strip contacting the engine as illustrated. The movable sections 28 and 29 of the thermostat respectively formed of brass and steel, reversely positioned with respect to the strips 25 and 26 and secured thereto as at 30 in any suitable manner, the free ends of the strips 28 and 29 being associated with the reduced neck portion 19ª of the shaft 19.

In the form of the invention shown in Fig. 2, the bracket screw supports at its upper end the horizontally disposed sleeve 3ª having the connected fan head sections 31 and 32 journaled upon the forward end thereof, the pulley section 11ª carried by the fan head section 32 being directly journaled upon the forward end of the sleeve 3ª in the absence of ball bearing members. To retain the fan head upon the forward end of the shaft 3ª, said forward end is reduced and threaded as at 33 to receive a jamb nut 34 that engages the inner end wall of the fan head section 32. As described in connection with Fig. 1, the fan blades 13 are carried by radial bearing studs 15, the inner ends of which are journaled in the block 7ª carried by the fan head section 31, each bearing stud 15 carrying a laterally positioned and rearwardly directed arm 23ª bent at its end to provide a side projecting lug 24ª that extends into the grooved rim 22ª of the disc head 20ª carried by the forward end of the shaft 35 that is axially shiftable in the sleeve 3ª as illustrated.

The thermostatic element associated with the rear end of the shaft 35 to effect axial shifting movement thereof is spaced from the engine 1 and embodies a pair of crossed thermostatic elements 36, of a construction similar to the thermostatic elements illustrated in Fig. 1, the forward ends of the thermostatic elements being anchored as at 37 to the rear end of the sleeve 3ª, while the outer ends 38 thereof are secured to the rear end of the shaft 35.

In the form of the invention shown in Fig. 4, a shaft 39 having a link connection with an operating member 40 for the feathering fan blades 13 extends to the instrument board 41 of the automobile, the rear end of the shaft adjacent the instrument board being provided with an operating handle 42 and an indicator finger 43 moving over a dial plate 44 determining the exact feathered positions of the fan blades 13.

The devices disclosed herein for feathering the blades of a fan wheel are capable of use with either a water or air cooled motor, as well as for various other purposes, movements of the thermostatic elements associated with the rear ends of either of the shafts 19 or 35 effecting a feathering movement of the blades 13. Assuming that the blades 13 are in a neutral position as illustrated in Figs. 1 and 5, the temperature of the engine 1 and external atmosphere will agree, operation of the engine 1 causing the fan to rotate through the belt and pulley connection above described without producing a current of air in a direction toward or away from the engine. When the engine becomes hot, as indicated in Fig. 6, the thermostatic elements will expand and cause a longitudinal shifting movement of the shafts 19 or 35 and through their link and arm connections with the bearing studs 15 of the fan blades 13; said bearing studs will be partially rotated for feathering the blades 13 as indicated in Fig. 6, drawing the air through the radiator 45 in a direction toward the engine 1. When the engine is in a cold condition, the thermostatic elements will reversely position the feathering blades 13 as shown in Fig. 7 for drawing heated air in the immediate vicinity of the engine 1 and directing the same through the radiator 45 for purposes of warming the same. In the form of the invention shown in Fig. 1, the thermostatic element is directly connected to the engine 1, while as illustrated in Fig. 2 the thermostatic element is slightly spaced therefrom, but in sufficient proximity thereto to be effectively operated by heat radiating from the engine. In the form of the invention illustrated in Fig. 4 the operation of feathering the blades 13 is entirely manual, the same being effected by the handle 42 carried by the rear end of the shaft 39 upon the instrument board 41, the exact feathered position of the blades being determined by the pointer 43 moving over the dial plate 44. While the form of thermostatic element disclosed herein is of a strip or plate type, it is to be understood that any element effected by heat, such as fluid or the like, may be associated with the inner end of the axially shiftable rods 19 or 35 for moving the same in the sleeves 3 or 3ª. It is also intended that various forms of connecting means between the shafts 19 or 35, and the feathering blade studs 15 may be provided such as meshing gears or rack and segments.

While there are herein shown and described the preferred embodiments of the present invention, it is nevertheless to be understood that minor changes may be made therein without departing from the spirit and scope of the invention as claimed.

What is claimed as new is:—

1. In a motor fan wheel, a bracket supported forwardly of a motor vehicle engine, a horizontal shaft supported by the bracket, a fan wheel rotatably supported adjacent the forward end of the shaft, said fan wheel including feathering blades, connections between the shaft and blades, and thermostatic means attached to the shaft disposed adjacent the engine and supported by said bracket for axially shifting the shaft to feather the blades.

2. In a motor fan wheel, a bracket supported forwardly of a motor vehicle engine, a horizontal sleeve removably fixed in said bracket, a shaft axially shiftable in the sleeve, a fan head rotatably supported at the forward end of the sleeve, feathering fan blades rotatably supported in the head, connections between the fan blades and shaft effecting feathering movements of the blades upon axial movement of the shaft, and means for axially shifting said shaft.

3. In a motor fan wheel, a bracket supported forwardly of a motor vehicle engine, a horizontal sleeve removably secured to said bracket, a shaft axially shiftable in the sleeve, a fan head rotatably supported at the forward end of the sleeve, feathering fan blades rotatably supported in the head, connections between the fan blades and shaft effecting feathering movements of the blades upon axial movement of the shaft, and thermostatically operating means attached to the shaft and sleeve and disposed adjacent the engine for shifting said shaft.

4. In a motor fan wheel, a bracket supported forwardly of a motor vehicle engine, a horizontal sleeve removably secured to said bracket, a shaft axially shiftable in the sleeve, a fan head rotatably supported at the forward end of the sleeve, feathering fan blades rotatably supported in the head, each fan blade including a bearing stub journaled radially of the fan head and terminating therewithin, a rearwardly directed lateral arm carried by each stud and positioned within the head, the forward end of the shaft terminating within the fan head, a disc carried thereby positioned within the head and having an annular channel at the outer edge thereof, with the rear ends of the lateral arms extending into said channel for effecting feathering movements of the blades upon axial movements of the shaft, and means for axially shifting said shaft.

5. In a motor fan wheel, a bracket supported forwardly of a motor vehicle engine, a horizontal sleeve removably carried by said bracket, a two-part hollow fan head rotatably supported on the forward end of the sleeve, a shaft axially shiftable in the sleeve and having its forward end terminating within the hollow head, feathering fan blades having their inner ends rotatably supported in the head, means within said hollow head for connecting the fan blades and shaft effecting feathering movement of the blades upon axial movement of the shaft, and means for axially shifting said shaft.

6. In a motor fan wheel, a bracket supported forwardly of a motor vehicle engine, a horizontal sleeve removably carried by said bracket, a two-part hollow fan head rotatably supported on the forward end of the sleeve, a shaft axially shiftable in the sleeve and having a grooved disk carried by its forward end positioned within the hollow head, feathering fan blades having bearing studs journaled within the hollow head between the adjacent edges of the two parts of the same, means within said hollow head for connecting the fan blades and shaft effecting feathering movement of the blades upon axial movement of the shaft, and means for axially shifting said shaft.

7. In a motor fan wheel, a bracket supported forwardly of a motor vehicle engine, a horizontal sleeve removably carried by said bracket, a hollow fan head rotatably supported on the forward end of the sleeve, said fan head consisting of two separable parts with one of said parts rotatably connected to the sleeve and the other part having an integrally formed axial plug projecting into the head, a shaft axially shiftable in the sleeve and having a grooved disk on its outer end positioned within said hollow head, feathering fan blades each having a stud on their inner end journaled between the adjacent edges of the parts of the fan head with their inner ends journaled in radial recesses formed in the central plug carried by one fan head part, means within said hollow head for connecting the fan blades and the grooved disk carried by said shaft for effecting feathering movement of the blades upon axial movement of the shaft, and means for axially shifting said shaft.

In testimony whereof I affix my signature.

WILLIAM DZUS.